US010122241B2

(12) United States Patent
Narita et al.

(10) Patent No.: US 10,122,241 B2
(45) Date of Patent: Nov. 6, 2018

(54) TURBINE-TYPE FLOW RATE CONTROLLING DEVICE

(71) Applicant: Azbil Corporation, Tokyo (JP)

(72) Inventors: Hiroaki Narita, Tokyo (JP); Makoto Saruwatari, Tokyo (JP)

(73) Assignee: AZBIL CORPORATION, Tokyo (JP)

( * ) Notice: Subject to any disclaimer, the term of this patent is extended or adjusted under 35 U.S.C. 154(b) by 0 days.

(21) Appl. No.: 15/086,140

(22) Filed: Mar. 31, 2016

(65) Prior Publication Data

US 2016/0290152 A1 Oct. 6, 2016

(30) Foreign Application Priority Data

Mar. 31, 2015 (JP) ................................ 2015-073628

(51) Int. Cl.
| | | |
|---|---|---|
| F01D 15/10 | (2006.01) | |
| F01D 15/00 | (2006.01) | |
| F03B 15/08 | (2006.01) | |
| F03B 17/06 | (2006.01) | |
| F24F 11/00 | (2018.01) | |
| H02K 7/18 | (2006.01) | |
| F03B 13/00 | (2006.01) | |
| F24F 11/83 | (2018.01) | |
| F24F 11/85 | (2018.01) | |

(52) U.S. Cl.
CPC ........... *H02K 7/1823* (2013.01); *F03B 13/00* (2013.01); *F03B 15/08* (2013.01); *F24F 11/83* (2018.01);
(Continued)

(58) Field of Classification Search
CPC ........ F01D 15/10; F01D 15/005; F01D 13/00; F01D 15/00; H02K 7/1823; F05B 2220/32; F05B 2220/20; Y02E 10/28
See application file for complete search history.

(56) References Cited

U.S. PATENT DOCUMENTS

| | | | | |
|---|---|---|---|---|
| 7,456,531 | B2 * | 11/2008 | Yagi ..................... | H01L 25/112 310/68 C |
| 2008/0289335 | A1 * | 11/2008 | Drysdale ............... | F01D 15/005 60/649 |

(Continued)

FOREIGN PATENT DOCUMENTS

| | | |
|---|---|---|
| JP | H05106753 A | 4/1993 |
| JP | 2002-358126 A | 12/2002 |

(Continued)

OTHER PUBLICATIONS

Korean Office Action dated Oct. 16, 2017 in Patent Application No. 10-2016-0039191 (with English translation), citing documents AO-AQ therein, 10 pages.

*Primary Examiner* — Tulsidas C Patel
*Assistant Examiner* — Joseph Ortega
(74) *Attorney, Agent, or Firm* — Oblon, McClelland, Maier & Neustadt, L.L.P.

(57) ABSTRACT

A power generating portion formed of a rotor and a stator is provided. The rotor is formed of a ring incorporating a permanent magnet and an impeller. The rotor is regarded as a turbine. An actual flow rate of fluid flowing in a flow path is estimated from a present angular velocity of the turbine and a present torque of the power generating portion, a torque of the power generating portion in which the estimated actual flow rate corresponds to a setting flow rate is calculated and the torque of the power generating portion is controlled based on the calculated torque and a magnetic pole position of the turbine. The magnetic pole position of the turbine is estimated based on a present phase voltage value and a present phase current value of the power generating portion and a present winding temperature of the power generating portion.

6 Claims, 8 Drawing Sheets

(52) U.S. Cl.
CPC ....... *F05B 2220/20* (2013.01); *F05B 2220/32* (2013.01); *F05B 2220/602* (2013.01); *F05B 2220/706* (2013.01); *F05B 2270/101* (2013.01); *F24F 11/85* (2018.01); *Y02B 10/50* (2013.01); *Y02E 10/226* (2013.01); *Y02E 10/28* (2013.01)

(56) References Cited

U.S. PATENT DOCUMENTS

| | | | | |
|---|---|---|---|---|
| 2010/0150718 | A1* | 6/2010 | Freda | B60L 8/006 |
| | | | | 416/120 |
| 2013/0334824 | A1* | 12/2013 | Freda | F03D 1/04 |
| | | | | 290/55 |
| 2014/0009147 | A1* | 1/2014 | Taniguchi | G01R 33/028 |
| | | | | 324/258 |
| 2014/0338380 | A1* | 11/2014 | Kamiya | F25B 1/10 |
| | | | | 62/129 |
| 2014/0346984 | A1* | 11/2014 | Shiota | H02P 6/183 |
| | | | | 318/400.02 |
| 2015/0001975 | A1* | 1/2015 | Nakazono | H02K 1/06 |
| | | | | 310/152 |

FOREIGN PATENT DOCUMENTS

| | | |
|---|---|---|
| JP | 2005-102451 A | 4/2005 |
| JP | 200845855 A | 2/2008 |
| JP | 2010-110141 A | 5/2010 |
| JP | 2012241659 A | 12/2012 |

\* cited by examiner

TURBINE-TYPE FLOW RATE CONTROLLING DEVICE

CROSS-REFERENCE TO RELATED APPLICATION

This application claims priority to Japanese Application No. 2015-073628, filed Mar. 31, 2015. This application is incorporated herein in its entirety.

TECHNICAL FIELD

The present invention relates to a turbine-type flow rate controlling device controlling the flow rate of fluid by using a turbine.

BACKGROUND

In related art, an air conditioning controlling system includes an air conditioner such as a fan coil unit (FCU), in which cold/hot water is supplied to a heat exchanger of the air conditioner. A flow rate control valve is provided in a supply passage of cold/hot water to the heat exchanger of the air conditioner, and an air conditioning controlling device (controller) is provided as a device for controlling an opening of the flow rate control valve.

The air conditioning controlling device controls the opening of the flow rate control valve so that a difference between a measured value of a room temperature in a space to be controlled which receives supply of conditioned air from the air conditioner and a setting value of the room temperature set with respect to the room temperature becomes zero. The supply of cool/hot water to the heat exchanger of the air conditioner is controlled accordingly, and the temperature of conditioned air from the air conditioner to the space to be controlled is adjusted (for example, refer to Japanese Patent Publication No. 2008-45855A).

However, in the above air conditioning controlling system, the flow rate control valve provided in the supply passage of cold/hot water realizes the flow rate control by changing the opening area of a plug provided in the flow passage as a valve element to thereby generate pressure loss. The energy corresponding to the pressure loss generated at that time has been discarded wastefully as heat. There is also another problem that high power is necessary for driving the valve element.

In Japanese Patent Publication No. 2012-241659A (JP '659), a power generation device using a residual pressure of a water supply facility which generates power while reducing pressure of tap water in a water distribution pipeline is disclosed. In the power generation device using the residual pressure of the water supply facility, a hydraulic turbine provided in the water distribution pipeline through which tap water flows and a power generator generating the power by the rotation of the hydraulic turbine are provided, in which the pressure on a downstream side of the hydraulic turbine is reduced by a rotation resistance of the hydraulic turbine caused by a power generation load of the power generator.

In JP '659, a technique in which a torque of the power generator is controlled so that the flow rate of the hydraulic turbine reaches a target flow rate is disclosed as Embodiment 2. Hereinafter, the technique will be called the technique of JP '659.

Specifically, an angular velocity of the hydraulic turbine is detected, an estimated flow rate of the hydraulic turbine is calculated from the angular velocity of the hydraulic turbine and a torque command value, a pressure reducing amount is estimated from the estimated flow rate, a torque command value for realizing a target flow rate is calculated from the estimated pressure reducing amount, a difference between the estimated flow rate and the target flow rate is calculated, feedback items of the flow rate are added to the torque command value, a difference between a target angular velocity and the angular velocity is calculated, feedback items of the angular velocity are added to the torque command value, and the torque command value to which feedback items of the flow rate and the angular velocity are added is outputted to an inverter (refer to paragraphs [0043] to [0049], description concerning FIG. 7 and FIG. 8 in JP '659)

In the technique of JP '659, the target flow rate is a target value corresponding to the target pressure reducing amount (pressure difference of the hydraulic turbine between the upstream side and the downstream side), which is a given value to be determined so as to correspond to the water supply facility in the same manner as the target pressure reducing amount.

That is, in the technique of JP '659, it is assumed that the value of the target flow rate is a fixed and does not vary, and the torque of the power generator is controlled so that the estimated flow rate corresponds to the target flow rate determined as an invariable value. That is, in JP '659, there is no intention to control the actual flow rate by changing the value of the target flow rate, and an object thereof is just to take out electrical energy by using the residual pressure of the water supply facility.

There is disclosed in Japanese Patent Publication No. H05-106753A (JP '753) a valve with a built-in power generating device including a power generating device having a rotor arranged in a valve box and rotated by fluid energy at the time of opening a valve element and a power generator generating power by the rotation of the rotor, a power storage device storing power generated by the power generating device, an electric motor activated by an output voltage of the power storage device, and a power transmission mechanism transmitting the rotation output of the electric motor to a valve rod, in which an opening/closing device selecting a forward/reverse rotation and a stop of the electric motor to be executed is provided in an electric path which electrically connects the power storage device and the electric motor.

In the valve with the built-in power generating device disclosed in JP '753, the "power generating device" having the rotor and the power generator and the "valve device" controlling circulation and blocking of the fluid are provided in the valve so as to be separated from each other, therefore, a number of component parts are necessary and the size is increased in a flow direction of the fluid. Also in JP '753, there is no intention to control the actual flow rate by changing the value of the target flow rate, and an object thereof is just to open and close the valve element automatically by using the fluid energy generated at the time of opening the valve element to thereby reduce the energy loss. Though the valve element is configured to be opened and closed automatically by using the generated power, high power is necessary as the valve element is used.

The present invention has been made for solving the above problems and an object thereof is to provide a turbine-type flow rate controlling device capable of saving power by controlling an actual flow rate without using a valve element.

Another object thereof is to provide a turbine-type flow rate controlling device capable of achieving reuse of energy and contributing to energy saving by collecting part of energy as electrical energy which has been discarded as heat at the time of controlling the actual flow rate.

Further another object is to provide a turbine-type flow rate controlling device capable of securing long-term reliability by eliminating a position sensor for detecting a magnetic pole position of a turbine (a position of a magnetic pole of a magnet incorporated in the turbine).

SUMMARY

According to an example of the present invention, there is provided a turbine-type flow rate controlling device including a turbine converting energy of a fluid flowing in a flow path into rotational movement energy, a power generating portion converting the rotational movement energy converted by the turbine into electrical energy, a setting flow rate inputting portion inputting a setting flow rate values of which vary due to load fluctuation of a supply destination of the fluid, a flow rate controlling portion estimating an actual flow rate of the fluid flowing in the flow path from a present angular velocity of the turbine and a present torque of the power generating portion and calculating a torque of the power generating portion in which the estimated actual flow rate corresponds to the setting flow rate, a magnetic pole position estimating portion estimating a position of a magnetic pole of a magnet incorporated in the turbine as a magnetic pole position of the turbine; and a power generating portion controlling portion controlling the torque of the power generating portion based on the torque calculated by the flow rate controlling portion and the magnetic pole position of the turbine estimated by the magnetic pole position estimating portion.

According to the present invention, when the setting flow rate varies due to load fluctuation of the supply destination of the fluid, the actual flow rate of the fluid flowing in the flow path is estimated from the present angular velocity of the turbine and the present torque of the power generating portion, and the torque of the power generating portion is controlled so that the estimated actual flow rate corresponds to the setting flow rate. Accordingly, the flow rate of the fluid flowing in the flow path is controlled by the torque of the power generating portion, namely, a rotational torque of the turbine, not by the valve element.

Also in the present invention, the torque calculated by the flow rate controlling portion and the magnetic pole position of the turbine are used at the time of controlling the torque of the power generating portion. The magnetic pole position of the turbine is estimated by the magnetic pole position estimating portion. That is, the magnetic pole position of the turbine is detected without using a position sensor, not by using the position sensor. As the position sensor is directly installed in a pipe in the case of using the position sensor, installation environment is inferior, which becomes a problem in an aspect of long-term reliability. In response to this, the magnetic pole position of the turbine is estimated without using the position sensor in the example, therefore, the magnetic pole position of the turbine can be detected even in inferior environment where it is difficult to use the position sensor. Accordingly, long-term reliability can be secured.

According to the present invention, the turbine converting energy of the fluid flowing in the flow path into rotational movement energy and the power generating portion converting the rotational movement energy converted by the turbine into electrical energy are provided, the setting flow rate values of which vary due to load fluctuation of the supply destination of the fluid is inputted, the actual flow rate of the fluid flowing in the flow path is estimated from the present angular velocity of the turbine and the present torque of the power generating portion, and the torque of the power generating portion is controlled so that the estimated actual flow rate corresponds to the setting flow rate, therefore, the actual flow rate is controlled without using the valve elements, which can realize power saving.

Additionally, part of energy discarded as heat at the time of controlling the actual flow rate is collected as electrical energy, thereby realizing reuse of energy and contributing to energy saving.

It is further possible to realize both functions of flow rate control and power generation by the "power generating device" formed of the turbine and the power generating portion, which can reduce the number of component parts and realize size reduction.

Also according to the present invention, the magnetic pole position of the turbine is estimated, and the torque of the power generating portion is controlled based on the estimated magnetic pole position of the turbine and the torque calculated by the flow rate controlling portion, therefore the position sensor detecting the magnetic pole position of the turbine can be eliminated and the magnetic pole position of the turbine can be known even in the inferior environment where it is difficult to use the position sensor, thereby securing long-term reliability.

DETAILED DESCRIPTION

Figure 1:
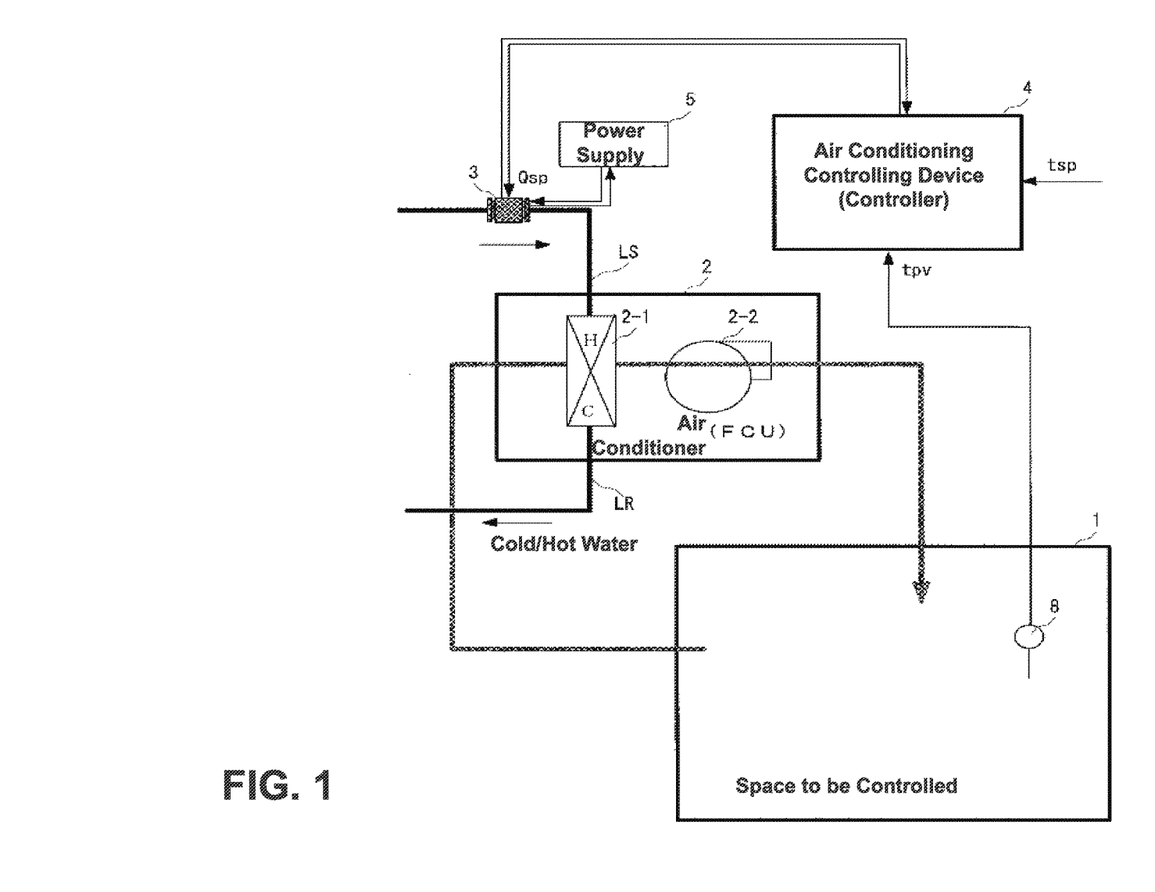
FIG. 1 is an instrumentation diagram showing an example of an air conditioning controlling system using a turbine-type flow rate controlling device according to the present invention.

Hereinafter, examples of the present invention will be explained in detail with reference to the drawings. FIG. 1 is an instrumentation diagram showing an example of an air conditioning controlling system using a turbine-type flow rate controlling device according to the present invention.

In FIG. 1, "1" denotes a space to be controlled, "2" denotes an air conditioner (FCU) supplying conditioned air to the space to be controlled 1, "3" denotes a turbine-type flow rate controlling device according to the present invention, "4" denotes an air conditioning controlling device (controller) and "5" denotes an external power supply provided with respect to the turbine-type flow rate controlling device 3.

The air conditioner 2 includes a heat exchanger (cold/hot water coil) 2-1 and a fan 2-2. The turbine-type flow rate controlling device 3 is provided in a supply passage (flow path) of cold/hot water to the heat exchanger 2-1 of the air conditioner 2. In the example, the turbine-type flow rate controlling device 3 is provided in a water delivery conduit LS of cold/hot water to the heat exchanger 2-1 of the air conditioner 2.

As the heat exchanger 2-1 of the air conditioner 2, there exist a single-coil type exchanger which performs heat exchange by one coil making cold water at the time of cooling and making hot water at the time of heating and a double-coil type exchanger by two coils performing heat exchange by a cold water coil at the time of cooling and performing heat exchange by a hot water coil at the time of heating. In the example, the heat exchanger 2-1 is assumed to be the single-coil type one.

A room temperature sensor 8 measuring the temperature in the space to be controlled 1 as a room temperature is provided in the space to be controlled 1. The room temperature measured by the room temperature sensor 8 (a measured value tpv of the room temperature) is transmitted to the controller 4.

The controller 4 calculates a setting flow rate Qsp of cold/hot water to the heat exchanger 2-1 of the air conditioner 2 as an output for controlling a difference between the measured value tpv of the room temperature and a setting value tsp of the room temperature to be zero, transmitting the calculated setting flow rate Qsp to the turbine-type flow rate controlling device 3.

Figure 2:
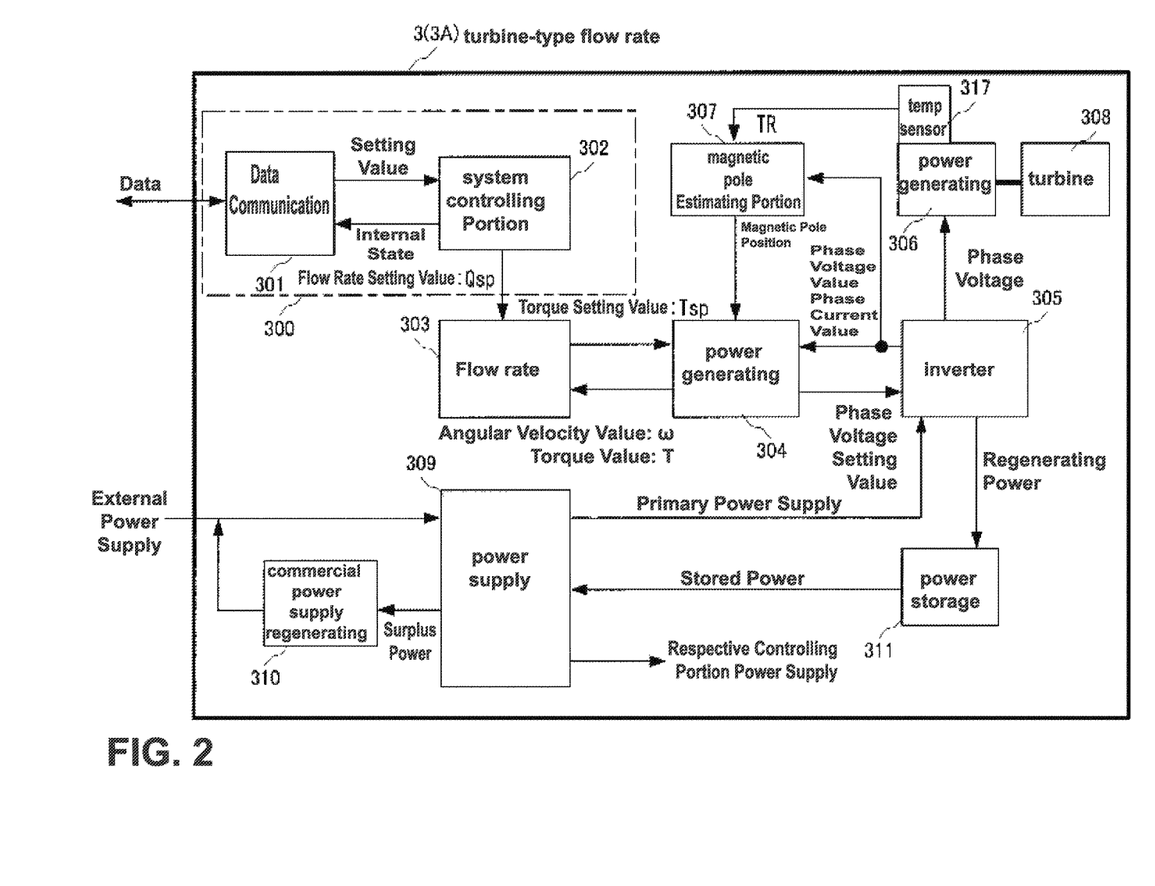
FIG. 2 is a configuration diagram of a relevant part of the turbine-type flow rate controlling device used for the air conditioning controlling system according to an example.

FIG. 2 shows a configuration diagram of a relevant part of the turbine-type flow rate controlling device 3 according to an example. The turbine-type flow rate controlling device 3 (3A) according to this Example includes a data communication portion 301, a system controlling portion 302, a flow rate controlling portion 303, a power generating portion controlling portion 304, an inverter 305, a power generating portion 306, a magnetic pole position estimating portion 307, a turbine 308, a power supply portion 309, a commercial power supply regenerating portion 310, a power storage portion 311 and a temperature sensor 317, in which the turbine-type flow rate controlling device 3 is connected to the controller 4 and to the external power supply 5 by cables.

The data communication portion 301 has a function of performing transmission/reception of data with respect to the controller 4, receiving data such as a setting value from the controller 4 and transmitting data such as an internal state of the turbine-type flow rate controlling device 3 to the controller 4.

The system controlling portion 302 has a function of controlling the entire system of the turbine-type flow rate controlling device 3, inputting received data such as a setting value from the data communication portion 301 and outputting transmission data such as an internal state of the turbine-type flow rate controlling device 3 to the data communication portion 301. The system controlling portion 302 also takes out the setting flow rate Qsp from received data such as the setting value transmitted from the data communication portion 301 as a flow rate setting value, and the taken-out flow rate setting value Qsp to the flow rate controlling portion 303.

The flow rate controlling portion 303 has a function of estimating a dimensionless flow rate and a dimensionless differential pressure from an angular velocity value (a present angular velocity of the turbine 308) ω from the power generating portion controlling portion 304 and a torque value (a present torque of the power generating portion 306) T, a function of estimating an actual flow rate Q and an actual differential pressure ΔP from the estimated dimensionless flow rate and the dimensionless differential pressure and a function of calculating a torque of the power generating portion 306 in which the estimated actual flow rate Q corresponds to the flow rate setting value Qsp as a torque setting value Tsp according to a flow rate control law, inputting the flow rate setting value Qsp from the system controlling portion 302, the angular velocity value ω and the torque value T from the power generating portion controlling portion 304, and outputting the calculated torque setting value Tsp to the power generating portion controlling portion 304.

The power generating portion controlling portion 304 has a function of calculating a phase voltage setting value to the inverter 305 so that the torque of the power generating portion 306 corresponds to the torque setting value Tsp according to a vector control law, a function of calculating a present angular velocity of the turbine 308 as the angular velocity value ω from a magnetic pole position (to be described later) of the turbine 308 estimated by the magnetic pole position estimating portion 307 and a function of calculating the present torque of the power generating portion 306 as the torque value T from a present phase voltage value and a present phase current value of a stator winding of the power generating portion 306 from the inverter 305, inputting the magnetic pole position of the turbine 308 estimated by the magnetic pole position estimating portion 307, the phase voltage value and the phase current value from the inverter 305 and the torque setting value Tsp from the flow rate controlling portion 303, outputting the calculated angular velocity value ω and the torque value T to the flow rate controlling portion 303 and outputting the calculated phase voltage setting value to the inverter 305.

The inverter 305 has a function of inputting the phase voltage setting value from the power generating portion controlling portion 304 and outputting the phase voltage setting value to the stator winding of the power generating portion 306 as the phase voltage, a function of outputting the present phase voltage value and the present phase current value of the stator winding of the power generating portion 306 to the power generating portion controlling portion 304 and the magnetic pole position estimating portion 307 and a function of regenerating power generated in the power generating portion 306 with respect to the power storage portion 311, which operates by receiving the primary power supply from the power supply portion 309.

Figure 3:
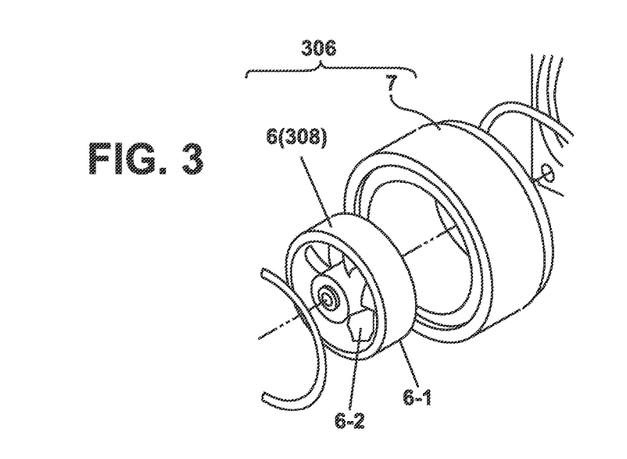
FIG. 3 is a perspective view shown by extracting a relevant part of a power generating portion in the turbine-type flow rate controlling device.
Figure 4:
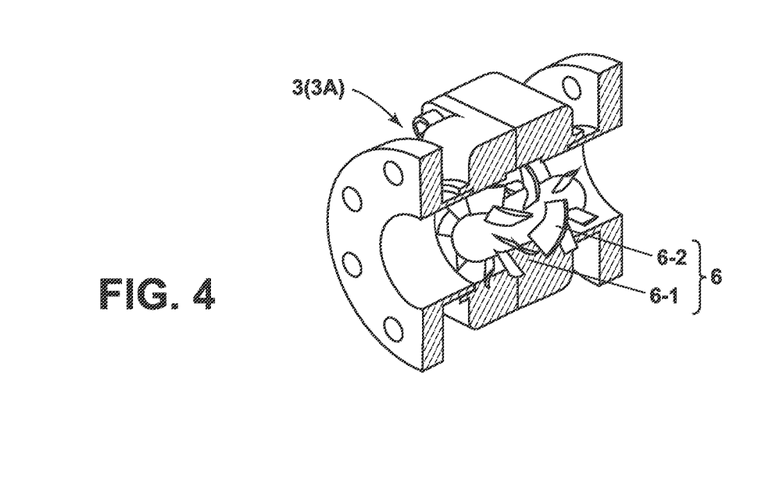
FIG. 4 is a perspective view showing a rotor provided in a conduit line of the turbine-type flow rate controlling device.

The power generating portion 306 includes a rotor 6 and a stator 7 as shown by extracting a relevant part in FIG. 3. The rotor 6 includes a ring 6-1 incorporating a permanent magnet and an impeller 6-2 integrally provided inside the ring 6-1. The rotor 6 is provided in a conduit line so that a shaft center thereof corresponds to a shaft center of the conduit line (see FIG. 4), and the entire rotor 6 rotates by receiving a water flow of cold/hot water flowing in the conduit line. That is, the ring 6-1 rotates together with the impeller 6-2. In FIG. 2, the rotor 6 is shown as the turbine 308 in a manner separated from the power generating portion 306 for convenience.

Coils are wound around the stator 7, and power generated by rotation of the turbine 308 is taken out by using the coils as stator winding. The temperature sensor 317 detects a temperature of the coils (stator winding) wound around the stator 7 and transmits the detected temperature of the stator winding as a winding temperature TR to the magnetic pole position estimating portion 307. The magnetic pole position estimating portion 307 estimates a position of a magnetic pole of the permanent magnet incorporated in the ring 6-1 as the magnetic pole position of the turbine 308 based on the present phase voltage value and the present phase current value of the stator winding of the power generating portion 306 from the inverter 305, and the present winding temperature TR of the stator winding of the power generating portion 306 from the temperature sensor 317.

The power supply portion 309 receives power from the external power supply 5 and stored power stored in the power storage portion 311 as inputs, distributing the power to be used in the turbine-type flow rate controlling device 3A. In the example, the power to the inverter 305 is for a primary power supply and the power to the data communication portion 301, the system controlling portion 302, the flow rate controlling portion 303, the power generating portion controlling portion 304 and so on is for respective controlling portion power supplies.

The power supply portion 309 distributes power obtained by adding the power from the external power supply 5 and the stored power stored in the power storage portion 311, and the stored power stored in the power storage portion 311 is preferentially distributed. When the stored power stored in the power storage portion 311 is short, the power obtained by adding power supplied from the external power supply 5 is distributed. When the stored power stored in the power storage portion 311 is abundant, the abundant power is regenerated as surplus power in a commercial power supply (the external power supply 5 in the example) through the commercial power supply regenerating portion 310.

In the turbine-type flow rate controlling device 3A, functions of the data communication portion 301, the system controlling portion 302, the flow rate controlling portion 303, the power generating portion controlling portion 304, the inverter 305, the magnetic pole position estimating portion 307, the power supply portion 309, the commercial power supply regenerating portion 310 and so on are realized by hardware including a processor, a memory device, a digital input/output circuit, an analog input/output circuit, a power electronics circuit and so on, and a program executing various functions in cooperation with the hardware. Also in the turbine-type flow rate controlling device 3A, the data communication portion 301 and the system controlling portion 302 configure a setting flow rate inputting portion 300.

Next, distinctive operations in the turbine-type flow rate controlling device 3A will be explained. When the setting flow rate Qsp of cold/hot water from the controller 4 varies, that is, when the setting flow rate Qsp of cold/hot water varies due to load fluctuation of a supply destination of cold/hot water, the turbine-type flow rate controlling device 3A receives the varied setting flow rate Qsp by the data communication portion 301, and the data communication portion 301 transmits the received setting flow rate Qsp to the system controlling portion 302.

The system controlling portion 302 takes out the setting flow rate Qsp as the flow rate setting value Qsp and transmits the value to the flow rate controlling portion 303. The flow rate controlling portion 303 estimates a dimensionless flow rate and a dimensionless differential pressure from the angular velocity value (a present angular velocity of the turbine 308) ω and the torque value (a present torque of the power generating portion 306) T from the power generating portion controlling portion 304, and estimates the actual flow rate Q and the actual differential pressure ΔP from the estimated dimensionless flow rate and the dimensionless differential pressure. Then, the torque setting value Tsp in which the estimated actual flow rate Q corresponds to the flow rate setting value Qsp is calculated to be transmitted to the power generating portion controlling portion 304.

The power generating portion controlling portion 304 calculates a phase voltage setting value so that the torque of the power generating portion 306 corresponds to the torque setting value Tsp by receiving the torque setting value Tsp from the flow rate controlling portion 303, transmitting the value to the inverter 305. The inverter 305 receives the phase voltage setting value from the power generating portion controlling portion 304 and outputs the phase voltage setting value to the stator winding of the power generating portion 306 as a phase voltage as well as outputting the present phase voltage value and the present phase current value of the stator winding of the power generating portion 306 to the power generating portion controlling portion 304 and the magnetic pole position estimating portion 307. The magnetic pole position estimating portion 307 estimates the magnetic pole position of the turbine 308 based on the present phase voltage value and the present phase current value of the stator winding of the power generating portion 306 as well as the present winding temperature TR of the stator winding of the power generating portion 306, and outputs the estimated magnetic pole position of the turbine 308 to the power generating portion controlling portion 304.

Figure 5:
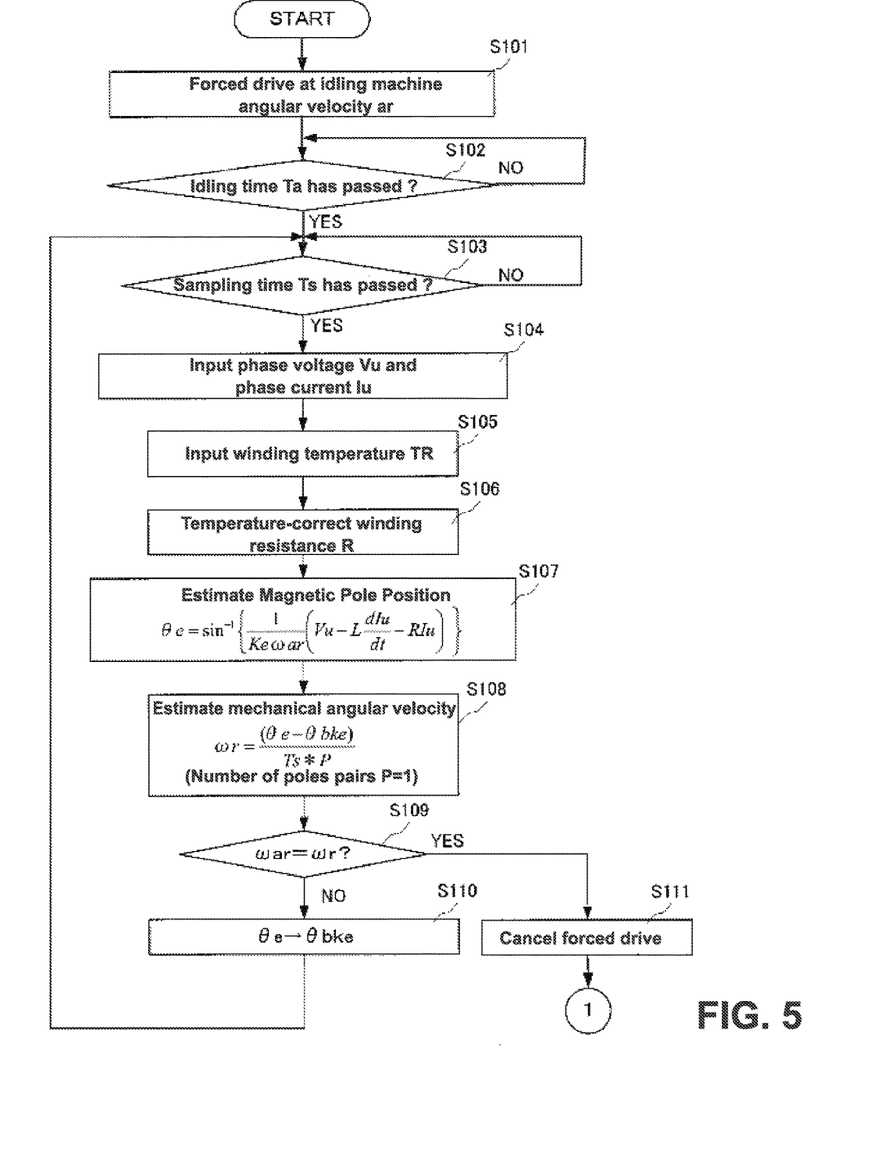
FIG. 5 is a flow chart of unique processing operations performed by cooperation of a flow rate controlling portion, a power generating portion controlling portion, an inverter and a magnetic pole position estimating portion in the turbine-type flow rate controlling device.
Figure 6:
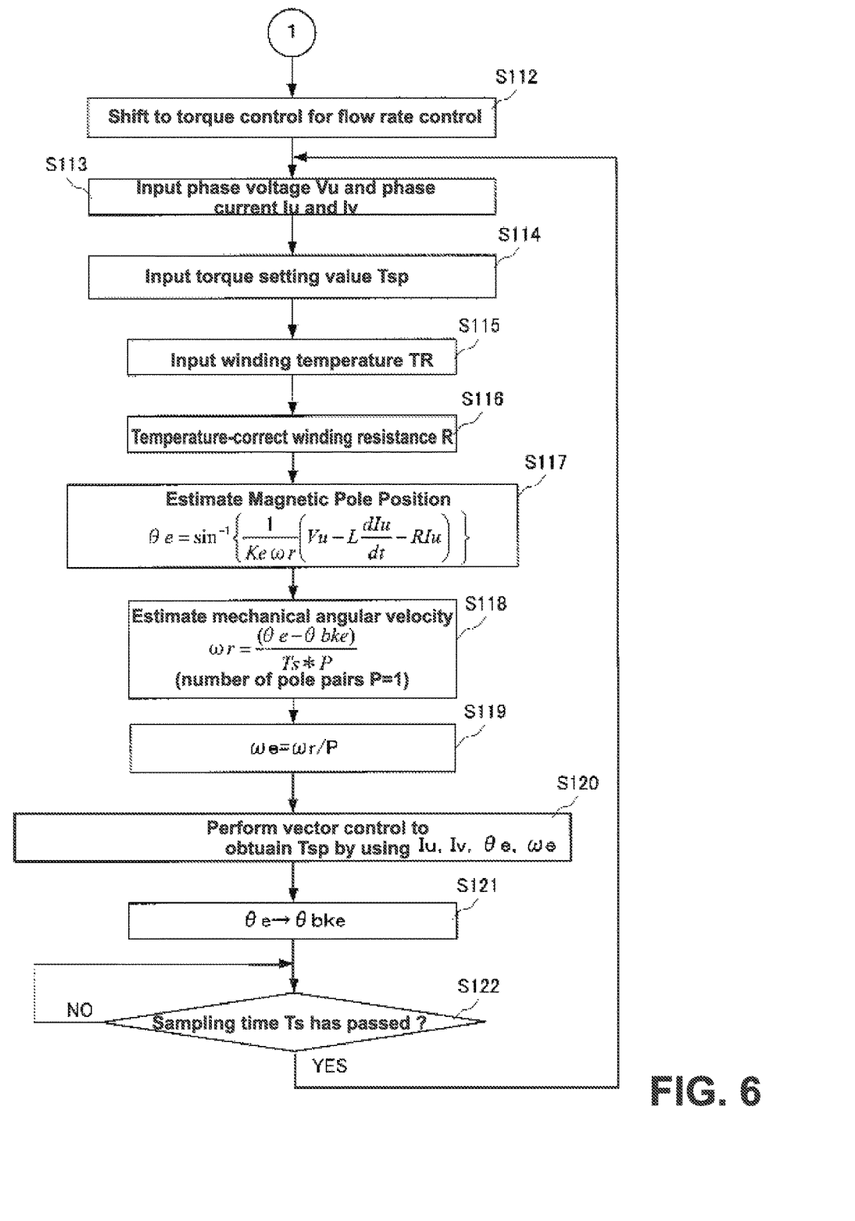
FIG. 6 is a flow chart continued from FIG. 5.

FIG. 5 and FIG. 6 show flow charts of processing operations performed by cooperation of the flow rate controlling portion 303, the power generating portion controlling portion 304, the inverter 305 and the magnetic pole position estimating portion 307, which are unique to the example. The processing operations are performed by a processor (CPU (Central Processing Unit)) in the turbine-type flow rate controlling device 3A.

First, the CPU forcibly rotates the turbine 308 at an idling mechanical angular velocity war (FIG. 5: Step S101). Then, after an idling time Ta passes (YES in Step S102), processing operations of Steps S104 to S110 explained below are repeated every time a sampling time Ts passes (YES of Step S103).

The CPU inputs a present U-phase phase voltage value Vu and a present phase current value Iu of the stator winding of the power generating portion 306 (Step S104), and the present winding temperature TR of the stator winding of the power generating portion 306 (Step S105). Then, a winding resistance R of the stator winding of the power generating portion 306 (winding resistance in a reference temperature) is temperature-corrected by the winding temperature TR (Step S106), and the magnetic pole position of the turbine 308 is estimated by the following formula (1) (Step S107).

Formula 1

$$\theta e = \sin^{-1}\left\{\frac{1}{Ke\omega ar}\left(Vu - L\frac{dIu}{dt} - RIu\right)\right\} \quad (1)$$

That is, θe (rad) calculated by the formula (1) is determined as an electric magnetic pole position estimated value of the turbine 308. In the formula (1), "L" denotes an inductance of the stator winding (winding inductance) of the power generating portion 306, and "Ke" denotes a counter electromotive force.

Then, the mechanical angular velocity of the turbine 308 is estimated by the following formula (2) (Step S108). That is, "ωr" calculated by the following formula (2) is determined as a mechanical angular velocity estimated value of the turbine 308. In the formula (2), θbke (rad) denotes a previous electric magnetic pole position estimated value, an initial value of which is "0".

Formula 2

$$\omega r = \frac{(\theta e - \theta bke)}{Ts * P} \quad (2)$$

(the number of pole pairs $P = 1$)

After the CPU calculates the mechanical angular velocity estimated value ωr by the above manner, the CPU checks whether the mechanical angular velocity estimated value ωr is equal to the idling mechanical angular velocity ωar or not (Step S109). When the mechanical angular velocity estimated value ωr is not equal to the idling mechanical angular velocity ωar (No in Step S109), the electric magnetic pole position estimated value θe calculated in Step S107 is replaced with the previous electric magnetic pole position estimated value θbke (Step S110), and the process returns to Step S103, where the processing operations of Steps S103 to S110 are repeated.

While the processing operations of Steps S103 to S110 are repeated, when the mechanical angular velocity estimated value ωr becomes equal to the idling mechanical angular velocity ωar (YES in Step S109), the CPU determines that the preparation to use the estimated value of the magnetic pole position of the turbine 308 is completed, cancelling the forced drive at the idling mechanical angular velocity ωar (Step S111), and shifting the process to the torque control for controlling the flow rate (FIG. 6: Step S112).

In the torque control for controlling the flow rate, the CPU inputs the present U-phase phase voltage value Vu, the present phase current value Iu and a present V-phase phase current value Iv of the stator winding of the power generating portion 306 (Step S113), inputs the torque setting value Tsp (Step S114) and inputs the present winging temperature TR of the stator winding of the power generating portion 306 (Step S115).

Then, the winding resistance R of the stator winding of the power generating portion 306 is temperature-corrected by the wingding temperature TR (Step S116) and the magnetic pole position of the turbine 308 is estimated by the following formula (3) (Step S117).

Formula 3

$$\theta e = \sin^{-1}\left\{\frac{1}{Ke\omega r}\left(Vu - L\frac{dIu}{dt} - RIu\right)\right\} \quad (e)$$

That is, the electric magnetic pole position estimated value θe (rad) of the turbine 308 is calculated by the above formula (3) in which "ωar" in the formula (1) used in Step S107 is replaced with "ωr".

The mechanical angular velocity of the turbine 308 is estimated by the following formula (4) (Step S118). That is, the mechanical angular velocity estimated value ωr of the turbine 308 is calculated by the following formula (4) which is the same as the formula (2).

Formula 4

$$\omega r = \frac{(\theta e - \theta bke)}{Ts * P} \quad (4)$$

(the number of pole pairs $P = 1$)

Then, the CPU calculates the electric angular velocity estimated value ωe of the turbine 308 by defining that ωe=ωr/P from the calculated mechanical angular velocity estimated value ωr (Step S119), controlling the phase voltage to the stator winding of the power generating portion 306 according to the vector control law so as to obtain the torque setting value Tsp inputted in Step S114 by using "Iu", "Iv" inputted in Step S113 and "θe", "ωe" obtained in Steps S117, S119 (Step S120).

Then, the CPU replaces the electric magnetic pole position estimated value θe calculated in Step S117 with the previous electric magnetic pole position estimated value θbke (Step S121), waiting for a lapse of the sampling time Ts (Step S122) and repeating the processing operations (sensorless vector control) of Steps S113 to S121 every time the sampling time Ts passes (YES in Step S122). Accordingly, the torque of the power generating portion 306 is matched to the torque setting value Tsp, and the actual flow rate of cold/hot water flowing in the conduit line is adjusted to the flow rate setting value Qsp.

The processing operations of Steps S101 to S122 are performed by cooperation of the flow rate controlling portion 303, the power generating portion controlling portion 304, the inverter 305 and the magnetic pole position estimating portion 307, and the estimation of the magnetic pole position of the turbine 308 in Steps S104 to S107 or in Steps S113 to S117 is taken charge of by the magnetic pole position estimating portion 307.

As described above, the flow rate of fluid flowing in the conduit line is controlled not by the valve element but by the torque of the power generating portion 306, namely, the rotational torque of the turbine 308 according to the example. Accordingly, high power necessary for driving the valve element is not required, and the power can be saved.

Also in the example, the power generated by the power generating portion 306 is stored in the power storage portion 311, transmitted to the power supply portion 309 as the stored power and used in respective portions in the turbine-type flow rate controlling device 3. Accordingly, part of energy which has been discarded as heat at the time of controlling the actual flow rate is collected as electrical energy, and reused in the turbine-type flow rate controlling device 3A.

In the case where the stored power stored in the power storage portion 311 is abundant, the abundant power is regenerated as surplus power in a commercial power supply in the example, therefore, the surplus power in the turbine-type flow rage controlling device 3A is also used effectively. For example, the surplus power is supplied to other devices such as the sensor or the controller, which can contribute to the energy saving in a comprehensive manner.

Also according to the example, both functions of flow rate control and power generation can be realized by the "power generating device" which is formed of the turbine 308 and the power generating portion 306, that is, both functions of flow rate control and power generation can be realized by the "power generating device" which is formed of the turbine 308 (rotor 6) and the stator 7 shown in FIG. 3, therefore, the size reduction can be realized by removing the "valve device" as disclosed in JP '753 and reducing the number of component parts. Accordingly, the turbine-type flow rate controlling device can be formed with the size of an existing flow rate control valve, and energy saving can be realized by replacing the existing flow rate control valve with the turbine-type flow rate controlling device.

The actual flow rate of cold/hot water flowing in the conduit line is estimated from the present angular velocity ω of the turbine 308 and the present torque value T of the power generating portion 306, and the torque of the power generating portion 306 is controlled so that the estimated actual flow rate corresponds to the flow rate setting value Qsp in the example, therefore, expensive sensors such as a pressure sensor, and a flow-rate sensor can be eliminated and the increase of costs can be suppressed.

Also in the example, the torque calculated by the flow rate controlling portion 303 and the magnetic pole position of the turbine 308 are used for controlling the torque of the power generating portion 306. The magnetic pole position of the turbine 308 is estimated by the magnetic pole position estimating portion 307. That is, the magnetic pole position of the turbine 308 is detected without using a position sensor, not by using the position sensor 307. As the position sensor is directly installed in a pipe in the case of using the position sensor, installation environment is inferior, which becomes a problem in an aspect of long-term reliability. In response to this, the magnetic pole position of the turbine 308 is estimated without using the position sensor in the example, therefore, the magnetic pole position of the turbine can be detected even in inferior environment where it is difficult to use the position sensor. Accordingly, the position sensor is eliminated to thereby secure long-term reliability.

Turbine-Type Flow Rate Controlling Device: Another Example

Figure 7:
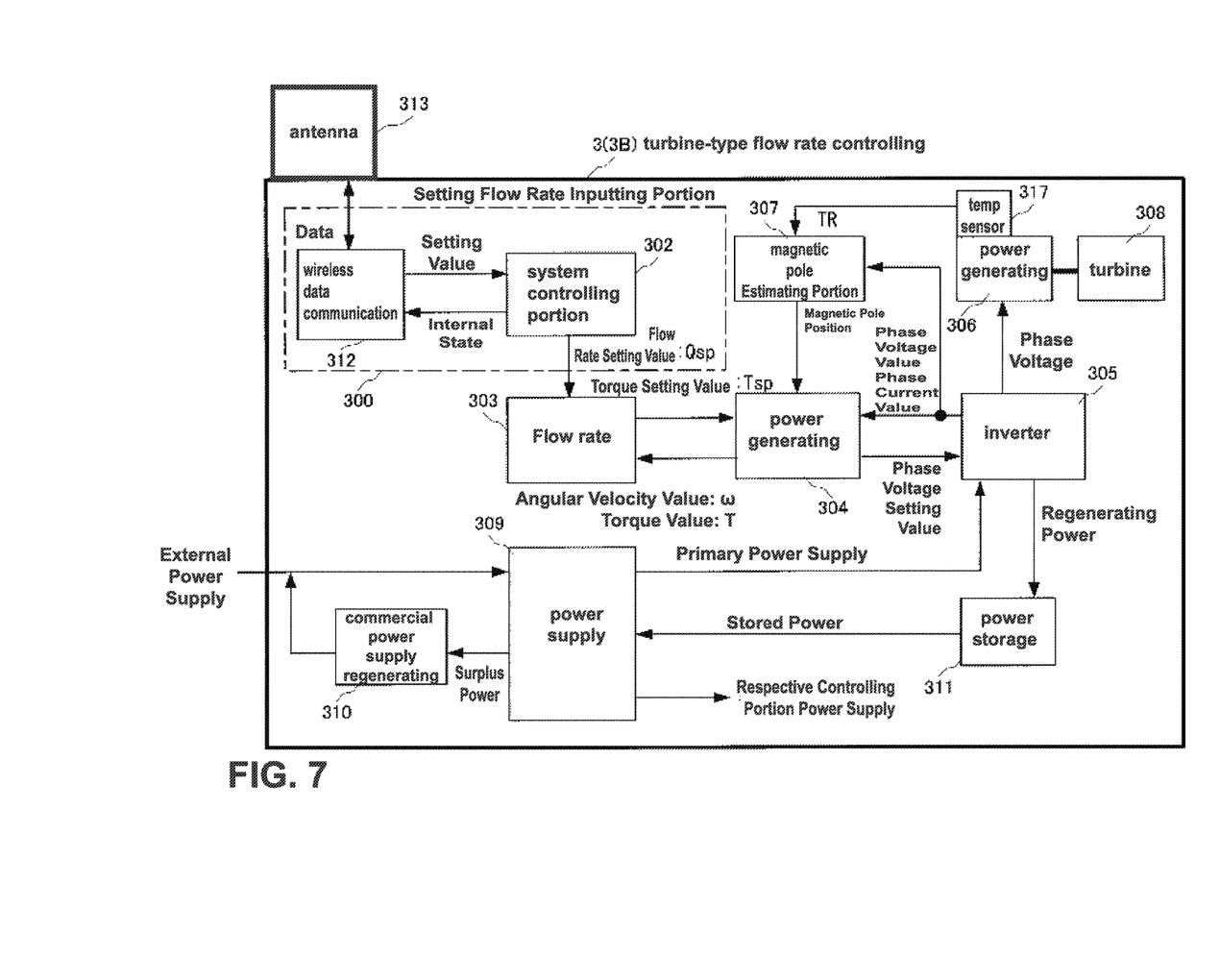
FIG. 7 is a configuration diagram of a relevant part of a turbine-type flow rate controlling device according to another Example.

Although the turbine-type flow rate controlling device 3A according to the above Example is connected to the controller 4 by the cable, connection to the controller 4 may be performed by wireless. FIG. 7 shows a configuration of a relevant part of a turbine-type flow rate controlling device 3 (3B) connected to the controller 4 by wireless as this Example.

In FIG. 7, the same symbols as FIG. 2 denote components equal to or equivalent to the components explained with reference to FIG. 2 and the explanation thereof is omitted. In the turbine-type flow rate controlling device 3B, a wireless data communication portion 312 is provided instead of the data communication portion 301, in which transmission/reception of data with respect to the controller 4 is performed through an antenna 313 by wireless.

In the turbine-type flow rate controlling device 3B, the wireless data communication portion 312 and the system controlling portion 302 configure the setting flow rate inputting portion 300.

Turbine-Type Flow Rate Controlling Device: A Further Example

Figure 8:
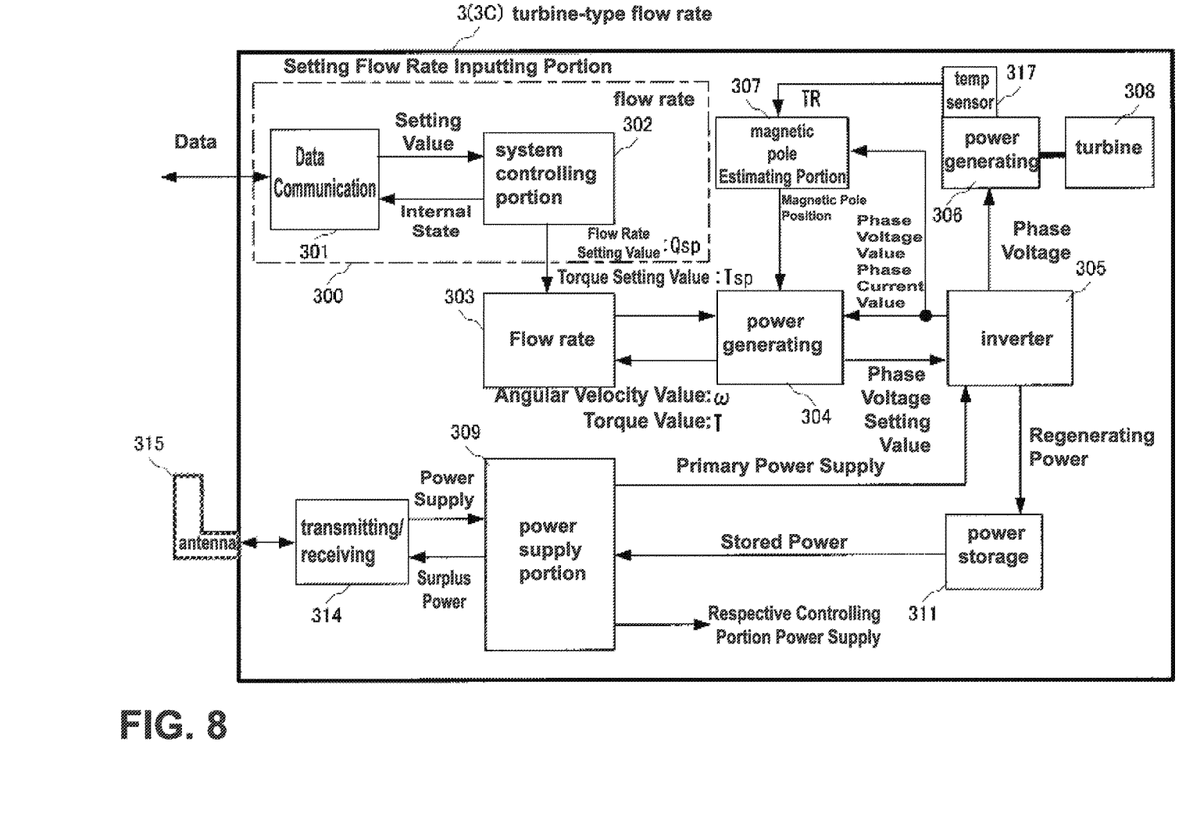
FIG. 8 is a configuration diagram of a relevant part of a turbine-type flow rate controlling device according to a further Example.

Although the turbine-type flow rate controlling device 3A according to the above Example is connected to the external power supply 5 by the cable, connection to the external power supply 5 may be performed by wireless. FIG. 8 shows a configuration of a relevant part of a turbine-type flow rate controlling device 3 (3C) connected to the external power supply 5 by wireless as this further Example.

In FIG. 8, the same symbols as FIG. 2 denote components equal to or equivalent to the components explained with reference to FIG. 2 and the explanation thereof is omitted. In the turbine-type flow rate controlling device 3C, a wireless transmitting/receiving portion 314 is provided instead of the commercial power supply regenerating portion 310, in which power from the external power supply 5 is received by wireless through an antenna 315 and transmitted to the power supply portion 309 as well as surplus power from the power supply portion 309 is regenerated in the commercial power supply (the external power supply 5 in this example) by wireless through the antenna 315.

Turbine-Type Flow Rate Controlling Device: A Yet Further Example

Figure 9:
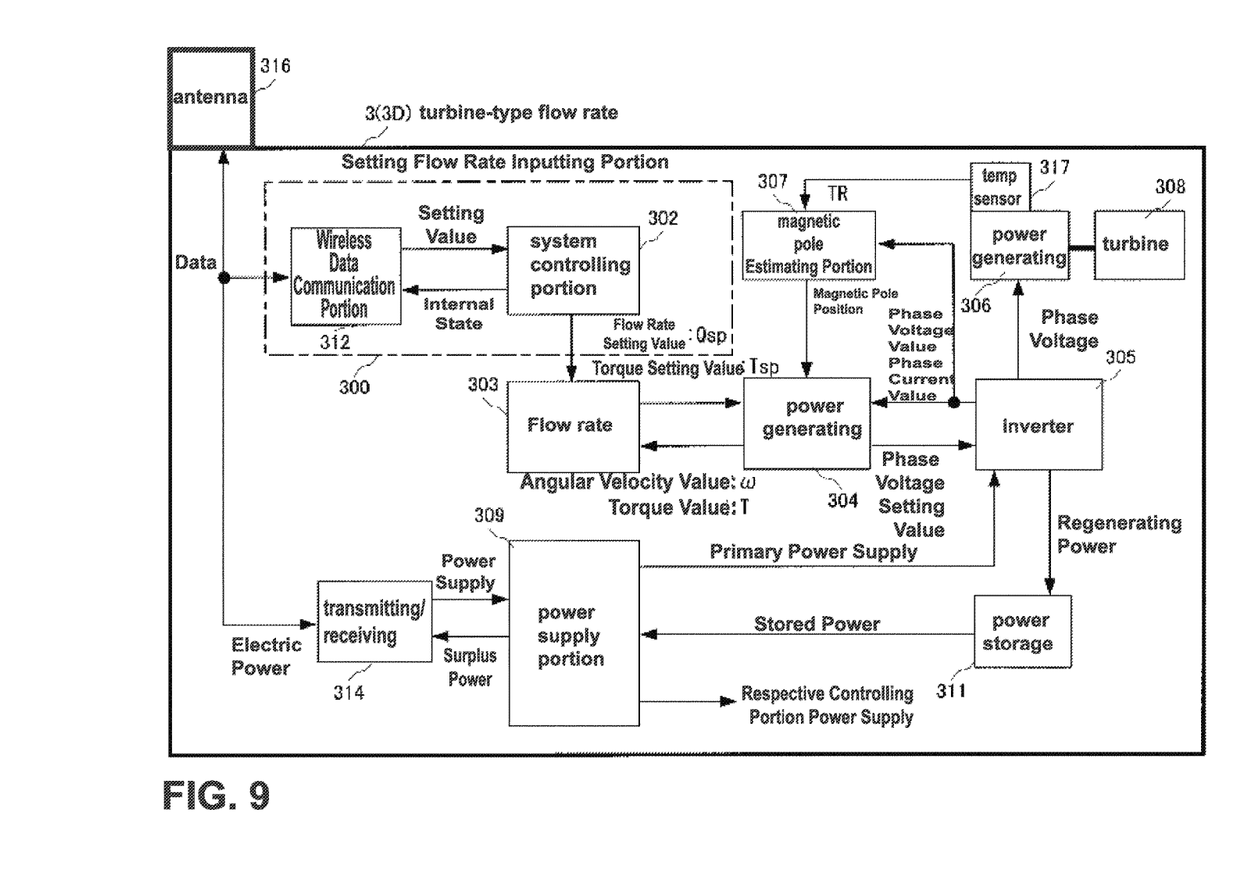
FIG. 9 is a configuration diagram of a relevant part of a turbine-type flow rate controlling device according to a yet further Example.

Although the turbine-type flow rate controlling device 3A according to the above Example is connected both to the controller 4 and to the external power supply 5 by cables, both connections to the controller 4 and to the external power supply 5 may be performed by wireless. FIG. 9 shows a configuration of a relevant part of a turbine-type flow rate controlling device 3 (3D) connected both to the controller 4 and to the external power supply 5 by wireless as this yet further Example.

In FIG. 9, the same symbols as FIG. 2 denote components equal to or equivalent to the components explained with reference to FIG. 2 and the explanation thereof is omitted. In the turbine-type flow rate controlling device 3D, the wireless data communication portion 312 is provided instead of the data communication portion 301, in which transmission/reception of data with respect to the controller 4 is performed through an antenna 316 by wireless. Moreover, the wireless transmitting/receiving portion 314 is provided instead of the commercial power supply regenerating portion 310, in which power from the external power supply 5 is received by wireless through the antenna 316 and transmitted to the power supply portion 309 as well as surplus power from the power supply portion 309 is regenerated in the commercial power supply (the external power supply 5 in this example) by wireless through the antenna 316.

As the turbine-type flow rate controlling device 3D is connected both to the controller 4 and to the external power supply 5 by wireless, all wiring to the turbine-type flow rate controlling device 3D is eliminated. Accordingly, contribution to reduction of environmental loads can be expected by using wireless communication, namely, elimination of wiring materials, contribution to improvement of workability/maintenability, elimination of each man-hour of wiring, reduction of work man-hours under an inferior environment, reduction of work man-hours in an additional instrumentation in an existing building and so on can be expected.

The connection to the external power supply 5 by wireless is realized because the turbine-type flow rate controlling device 3D is formed as a hybrid type in which the power from the external power supply 5 and the power generated in the power generating portion 306 are used to thereby reduce the supply of power from the external power supply 5.

Although it can be considered that a battery is used in a related-art flow rate control valve (the valve using the valve element) to realize a fully wireless system, it has been determined to be difficult to realize the system as the flow rate control valve is not able to be driven for a long period of time by the battery. That is, various problems such as reduction of power consumption in a controlling circuit and a communication circuit, reduction of communication frequency and increase of power density of the battery have to be solved, therefore, it is difficult to realize the fully wireless system in the related-art flow control valve.

In respond to the above, the hybrid type using the power from the outside and the power generated inside is adopted in the example, thereby realizing the fully wireless system of the flow rate control valve which has been difficult in the past, which is deserved to be called an epoch-making device. As the valve element is not used in the present invention, the device is called the turbine-type flow rate controlling device, not the flow rate control valve. Also in the present invention, the supply of power to the turbine-type flow rate controlling device from the outside may be eliminated to realize the fully wireless system as long as the operation of the device itself can be covered by the power generated inside.

Although the above examples have been explained as examples in which the present invention is applied to the air conditioning controlling system, it goes without saying that the present invention is not limited to be applied to the air conditioning controlling system but can be applied to various kinds of applications of flow rate control, and the application can be further expanded to general industrial equipment. The fluid the flow rate of which is controlled is not limited to liquid such as cold/hot water but may be gaseous matter such as gases.

The present invention has been explained by referring to the examples as the above, and the present invention is not limited to the above examples. Various alterations which can be understood by those who skilled in the art may occur in the configurations and the details of the present invention within a scope of technical ideas of the present invention.

What is claimed is:

1. A turbine-type flow rate controlling device, comprising:
    a turbine to convert energy of a fluid flowing in a flow path into rotational movement energy;
    a power generator to convert the rotational movement energy converted by the turbine into electrical energy;
    a flow rate controller configured to receive a setting flow rate, values of which vary due to a load fluctuation of a supply destination of the fluid, estimate an actual flow rate of the fluid flowing in the flow path from a present angular velocity of the turbine and a present torque of the power generator, and calculate a torque of the power generator for which the estimated actual flow rate will correspond to the received setting flow rate;
    a magnetic pole position estimator configured to estimate a position of a magnetic pole of a magnet incorporated in the turbine as a magnetic pole position of the turbine; and
    a power generating controller configured to control the torque of the power generator based on the torque calculated by the flow rate controller and the estimated magnetic pole position of the turbine.

2. The turbine-type flow rate controlling device according to claim 1, wherein the magnetic pole position estimator is further configured to estimate the magnetic pole position of the turbine based on a present phase voltage value, a present phase current value of the power generator, and a present temperature of winding of the power generator.

3. The turbine-type flow rate controlling device according to claim 1, further comprising an inverter configured to
    input a phase voltage setting value from the power generating controller,
    output a phase voltage to the power generator, and
    output a present phase voltage value and a present phase current value of the power generator, respectively, to the power generating controller and the magnetic pole position estimator.

4. A method of controlling a flow rate in a system including a turbine that converts energy of a fluid flowing in a flow path into rotational movement energy, and a power generator to convert the rotational movement energy into electrical energy, the method comprising:
    receiving a setting flow rate, values of which vary due to a load fluctuation of a supply destination of the fluid;
    estimating an actual flow rate of the fluid flowing in the flow path from a present angular velocity of the turbine and a present torque of the power generator, and calculating a torque of the power generator for which the estimated actual flow rate will correspond to the received setting flow rate;
    estimating a position of a magnetic pole of a magnet incorporated in the turbine as a magnetic pole position of the turbine; and
    controlling the torque of the power generator based on the calculated torque and the estimated magnetic pole position of the turbine.

5. The method of claim 4, wherein the step of estimating the magnetic pole position of the turbine comprises estimating the magnetic pole position of the turbine based on a present phase voltage value, a present phase current value of the power generator, and a present temperature of winding of the power generator.

6. The method of claim 4, further comprising:
    receiving a phase voltage setting value;
    outputting a phase voltage based on the phase voltage setting value; and
    outputting a present phase voltage value and a present phase current value of the power generator based on the phase voltage setting value.

* * * * *